United States Patent [19]

Sixtus

[11] Patent Number: 5,903,721
[45] Date of Patent: May 11, 1999

[54] METHOD AND SYSTEM FOR SECURE ONLINE TRANSACTION PROCESSING

[75] Inventor: Timothy Sixtus, New York, N.Y.

[73] Assignee: cha!Technologies Services, Inc., New York, N.Y.

[21] Appl. No.: 08/816,410

[22] Filed: Mar. 13, 1997

[51] Int. Cl.$^6$ .................................................. G06F 13/00
[52] U.S. Cl. ............................... 395/187.01; 395/188.01
[58] Field of Search ..................... 395/188.01, 187.01, 395/186; 380/3, 4, 21, 23, 24, 25, 30

[56] References Cited

U.S. PATENT DOCUMENTS

| | | | |
|---|---|---|---|
| 5,416,842 | 5/1995 | Aziz .......................................... | 380/30 |
| 5,557,518 | 9/1996 | Rosen ....................................... | 364/408 |
| 5,592,375 | 1/1997 | Salmon et al. ........................... | 395/207 |
| 5,649,099 | 7/1997 | Theimer et al. .................... | 395/187.01 |
| 5,678,041 | 10/1997 | Baker et al. ............................. | 395/609 |
| 5,684,950 | 11/1997 | Dare et al. .......................... | 395/187.01 |
| 5,684,951 | 11/1997 | Goldman et al. ................... | 395/188.01 |
| 5,754,761 | 5/1998 | Willsey ................................... | 395/186 |
| 5,758,069 | 5/1998 | Olsen ................................ | 395/187.01 |

OTHER PUBLICATIONS

Netscape Communications Corporation, "Netscape Live-Payment White Paper", Oct. 02, 1996 (located on Internet) pp. 1–14.
Michele Rosen, "Cash for Cyberspace", Midrange Systems, Apr. 12, 1996, pp. 34–35.
Stephan Somogyi, "Mediascape—How Would You Like to Pay for That?", Digital Media, vol.4, No. 7, pp. 13–17.
Candee Wilde, "Internet Security: A Moving Target", Interactive Age, May 13, 1996.
B. Clifford Newman et al. "Requirements for Network Payment: The NetCheque Perspective", pp. 32–36.
Jim Sabo, "Riding Shotgun on the Electronic Stagecoach", NetGuide, Aug., 1996, pp. 119–124.
Larry Loeb, "The Stage is Set", Internet World, Aug., 1996, pp. 55–59.
Marvin A. Sirbu, "Credits and Debits on the Internet", IEEE Spectrum, Feb., 1997, pp. 23–29.
David Chaum et al., "Minting Electronic Cash", IEEE Spectrum, Feb., 1997, pp. 31–34.
Peter S. Gemmell, "Traceable e–Cash", IEEE Spectrum, Feb., 1997, pp. 35–37.
Robert W. Baldwin et al., "Locking the e–Safe", IEEE Spectrum, Feb., 1997, pp. 40–46.

*Primary Examiner*—Joseph E. Palys
*Assistant Examiner*—Norman Michael Wright
*Attorney, Agent, or Firm*—Anthony R. Barkume

[57] ABSTRACT

A method for executing a secure online transaction between a vendor computer and a user computer, wherein the vendor computer and the user computer are interconnected to a computer network such as the Internet for data communications therebetween. The method comprises the steps of the user computer transmitting a transaction request message to the vendor computer via the computer network, the financial transaction request comprising user identification data unique to the user computer; in response to receiving the transaction request, the vendor computer sending a transaction verification request to a trust server computer interconnected to the computer network, the transaction verification request comprising the user identification data and data indicative of the requested transaction; in response to receiving the transaction verification request, the trust server computer authenticating the user computer by using the user identification data and communicating with the user computer for verification with the user identification data; and the trust server authorizing the transaction when the authenticating step has passed.

11 Claims, 10 Drawing Sheets

METHOD AND SYSTEM FOR SECURE ONLINE TRANSACTION PROCESSING

BACKGROUND OF THE INVENTION

This invention relates to online electronic commerce, and in particular to a secure methodology for approving an online transaction carried out over the Internet by authenticating the identity and credit of the purchaser without transmitting a credit card number or other payment means as part of the online transaction.

The Internet is constantly expanding at a very high pace and has become one of today's essential communication and information environments. But nevertheless, its potential as a facilitator of electronic commerce has not been fully realized. This is because today's networks are not secure enough for transmitting sensitive financial information. Despite the constant development of new encryption methods, they are seemingly never beyond a hacker's ability. Most users do not even want to take the chance of someone eavesdropping on their credit-card number or even postal address as it is carried along even the most secured network communication paths. The biggest problem for electronic commerce today is users' lack of trust and the psychological barriers to use of the Internet as a tool for commerce that arise therefrom.

Prior art systems have been developed in an effort to meet this need; for example, a system has been proposed called Secure Electronic Transaction (SET). With SET-enabled software and an account with a financial institution that supports the system, a user can go to an Internet World Wide Web (WWW) site, choose products to buy, and then order them with a few mouse clicks. The order is processed, the buyer's identity and account are verified, and the transaction is complete. Whether it's a checking or credit card account, or another payment system such as DIGICASH or FIRST VIRTUAL, it will be with a financial institution (such as MASTERCARD or VISA) that supports electronic payments, referred to as the Bank.

When a user opens the account, he receives from the Bank an electronic file called a certificate, which acts like a credit card for on-line purchases. It contains information about the user, including a public key, it has an expiration date, and it has been digitally signed by the Bank to ensure its validity. On the other end, merchants doing business with the Banks also get certificates that include both the merchant's public key and the Bank's public key. This certificate also is signed by the Bank to indicate that the merchant is legitimate. The merchant's key will be used for ordering, while the Bank's key will be used for paying.

The user indicates to the merchant what product or service he wishes to purchase via e-mail, through a Web page data transfer or the like. The following series of events is set in motion that takes a few seconds to complete. First, the user's software receives a copy of the merchant's certificate and verifies that it is dealing with a valid store since the certificate has been signed by the Bank. The user's software sends the merchant three items, all of which have been signed: the order information, which is encrypted with the merchant's public key; the payment information, which is encrypted with the Bank's public key (thus, the merchant cannot see the payment information); and a message digest (a code containing information from both the payment and the order) that ensures that the payment can only be used for that order.

After receiving these items, the merchant checks the user's digital signature. The merchant validates the user's

2 information with a third party (likely, but not necessarily, the Bank) to make sure the user is genuine. The merchant then sends the user a message indicating that the order has been received. The merchant also sends a signed message to the Bank using the Bank's public key. This message includes the customer's payment information (which the merchant can't interpret) and the merchant's certificate.

The Bank first verifies that the merchant is legitimate, then checks the signature of the message it just received to make sure that the message is legitimate. The Bank then opens the enclosed payment information from the customer and verifies that it is good. The Bank also checks to make sure the payment information is for that merchant and that particular order. The Bank signs and encrypts an authorization to the merchant, which can then ship the goods.

The SET system has been criticized for various reasons, one of which is the possibility that a keystroke stealing program that attaches itself to the keyboard drivers in a user's computer can lay dormant until it is activated by the presence of a digital wallet program. It then records the keystrokes performed (before they are encrypted) and sends them to a third party. Such a phantom program could be disseminated inside a modified (but seemingly normal) electronic-commerce software package unknowingly distributed by a financial institution.

The SET methodology relied heavily on encryption, which is also another potential weakness. Certificates play a major part in SET's security scheme. The parameter that gives the certificates mathematical resistance to decryption is the length of the original encryption key. SET certificates will use a key 1,024 bits long, which is felt to provide strong enough security. But, as with any encryption-based scheme, a hacker can break the code given enough time and computing power. The problem with a total reliance on cryptographic methods is that if they are decrypted, they fail totally. Worse, if decryption is performed by a third party and goes undetected by the legitimate users, a false sense of security ensues. Stronger security for electronic transactions must have some sort of backup mechanism in place, rather than simple faith in a particular encryption scheme.

In another prior art electronic commerce scheme, the FIRST VIRTUAL system does not rely on any form of cryptography, rather it allows non-sensitive transaction information to travel over the Internet, while users' credit card numbers are gathered by phone. In addition, there is a buyer feedback mechanism built atop existing Internet application protocols including e-mail, FTP, telnet, and the World Wide Web. Because those protocols carry no proof of identity, FIRST VIRTUAL uses a payment system based on e-mail call-backs. When asked to process a financial transaction, it looks up the buyer's account and sends an e-mail message asking the buyer to confirm the validity of the transaction. The buyer can respond with "yes", "no", or "fraud". Only when the buyer says "yes" is a financial transaction initiated.

Moreover, FIRST VIRTUAL's dependency on e-mail and the "VirtualPIN" avails itself to a potential hacker's perusal for several reasons. First, e-mail is relatively easy to subvert, since it uses well known ports and can be "spoofed" or faked with simple tools and a rudimentary understanding of SMTP (Simple Mail Transfer Protocol). In addition, in the case of a slow e-mail gateway (such as that provided by most commercially available online services), mail delivery can take up to a day or more. Furthermore, the VirtualPIN is static and therefore can be impersonated.

A different scheme for electronic payments was developed by DIGICASH, based on a digital wallet containing tokens. The tokens are validated (digitally countersigned) by a bank, but the bank can't trace the tokens to an individual user, None of the prior art systems provide a secure electronic commerce methodology sufficient to be carried out in large scale use over a non-secure network such as the Internet. Primary reasons for shortcomings of the prior art are the reliance on encryption as well as the transmittal of sensitive financial data over the Internet.

It is therefore an object of the present invention to provide a secure methodology and system for approving an online transaction carried out over the Internet by authenticating the identity and credit of the purchaser without transmitting a credit card number as part of the online transaction.

It is a further object of the present invention to provide such a system that does not rely on encryption for transmittal of data over the Internet as part of the transaction approval process.

It is a further object of the present invention to provide such a system that utilizes a third party as a trust broker that has users (purchasers) and vendors pre-registered, so that the trust broker may validate the transaction by authenticating the user by utilizing data internally stored that is not transmitted over the Internet.

SUMMARY OF THE INVENTION

In accordance with these and other objects, provided is a method for executing a secure online transaction between a vendor computer and a user computer, wherein the vendor computer and the user computer are interconnected to a computer network for data communications therebetween. The method comprises the steps of the user computer transmitting a transaction request message to the vendor computer via the computer network, the transaction request comprising user identification data unique to the user computer; in response to receiving the transaction request, the vendor computer sending a transaction verification request to a trust server computer interconnected to the computer network, the transaction verification request comprising the user identification data and data indicative of the requested transaction; in response to receiving the transaction verification request, the trust server computer authenticating the user computer by using the user identification data and communicating with the user computer for verification with the user identification data; and the trust server authorizing the transaction when the authenticating step has passed.

In particular, the user computer executes the transaction request by generating a user authentication number as a first function of a user registration number unique to the user computer, time stamp data correlated to the time of the transaction request, and an internally stored user matrix unique to the user computer; assigning a network protocol port number as a second function of the user registration number, the time stamp data, and the calculated user matrix; and transmitting a transaction request message to the vendor computer via the computer network, the transaction request message comprising the user registration number, the time stamp data, first data indicative of the requested transaction, and the network address associated with the user computer. The transaction verification request sent by the vendor computer to the trust broker comprises the user registration number, the time stamp data, second data indicative of the requested transaction, and the network address associated with the user computer. The trust server computer authenticates the user computer by calculating the user matrix by utilizing the received user registration number; generating a trust server authentication number as a first function of the received user registration number, the received time stamp data, and the calculated user matrix; calculating an expected network protocol port number as a second function of the received user registration number, the received time stamp data, and the calculated user matrix. The trust server communicates with the user computer by utilizing the user computer network address received from the vendor computer and the calculated expected network protocol port number. The trust server obtains from the user computer the user authentication number; it compares the obtained user authentication number with the generated trust server authentication number; and it indicates that the user computer is authentic when the comparison step has passed or indicates that the user computer is not authentic when the comparison step has failed, or the calculated port number is not available.

The first function for generating the user authentication number comprises the step of synthesizing a user matrix as a third function of the calculated user matrix; and the first function for generating a trust server authentication number comprises the step of synthesizing a trust server user matrix as the third function of the calculated user matrix. Further, the first function for generating a user authentication number utilizes the user registration number and the time stamp data to extract the user authentication number from the synthesized user matrix; and the first function for generating the trust server authentication number utilizes the user registration number and the time stamp data to extract the trust server authentication number from the synthesized trust server user matrix.

Thus, as will be evident, the present invention is a novel online method of payment which will solve today's electronic commerce problems and utilize the Internet's massive electronic commerce potential. The invention is a complete solution consisting of servers and clients which already have an existing trust relationship and therefore only need to communicate requests, and not financial data, in order to carry out online transactions.

The system provides the ability to conduct secure electronic commerce over the Internet without communication of sensitive or financial data. There's nothing to encrypt and therefore there's nothing to hack. Even if the online connection is eavesdropped, the information communicated over the wire is useless since it forms only part of the entire system, and is the product of a calculation, therefore it is dynamic as opposed to static information, which can be effectively reused.

A user interested in a vendor's product or service would simply access that vendor's Web pages, which already incorporate embedded transaction request buttons. By doing that, client software would be automatically downloaded to the user's machine. Once a transaction request button is clicked, a transaction takes place with no credit-card or address to type in. A few seconds pass from when a user initiates a transaction until it has been carried out.

Finally, as an integral part of the trust server system, the user-client employs a multimedia interface. The transaction request button appears as an attractive animated figure. When clicked, the animation changes accompanied by audio effects. And when the transaction is approved, the animation changes once more accompanied by an audio effect such as "cha-chang!"

A vendor needs a Web site in order to offer and engage in electronic commerce. In order to use the transaction authentication system, it registers with the trust broker via any preferred means (mail, fax, phone, or Internet). Then, it adds simple HTML tags to its Web pages, specifying information per each offered transaction. A user hitting such a Web page would need the user-client software module as a browser add-on in order to view the page. Therefore, if it is not already installed, it will be automatically downloaded and installed on the machine in a matter of seconds.

When a user requests to engage in his first transaction, he will have to register with the trust server via any preferred means (mail, fax, phone or Internet), and receive his User Registration Number. Upon entering this number and his chosen PIN in the user-client, a short introductory session takes place between it and the trust servers, which will later enable them to recognize each other online. After that, the first transaction can Lake place. Note that the PIN merely serves as a key to access the user-client, and is never sent over the wire.

In order to request a transaction, a user simply has to click the embedded button and enter his PIN. After that everything is done automatically. The request is sent via the vendor to the trust servers. Upon receipt of the request, the trust servers authenticate the user's machine using the same algorithm used by the user-client in order to verify its desire to carry out the transaction. After the user's credit has been cleared and the user computer's identity authenticated, the transaction is carried out and the status is shown to the user. All of this happens in a few seconds.

The system accurately tracks all transactions taken place in a database, sending vendors and users daily or monthly reports of transactions in which they participated.

DETAILED DESCRIPTION OF THE PREFERRED EMBODIMENT

Figure 1:
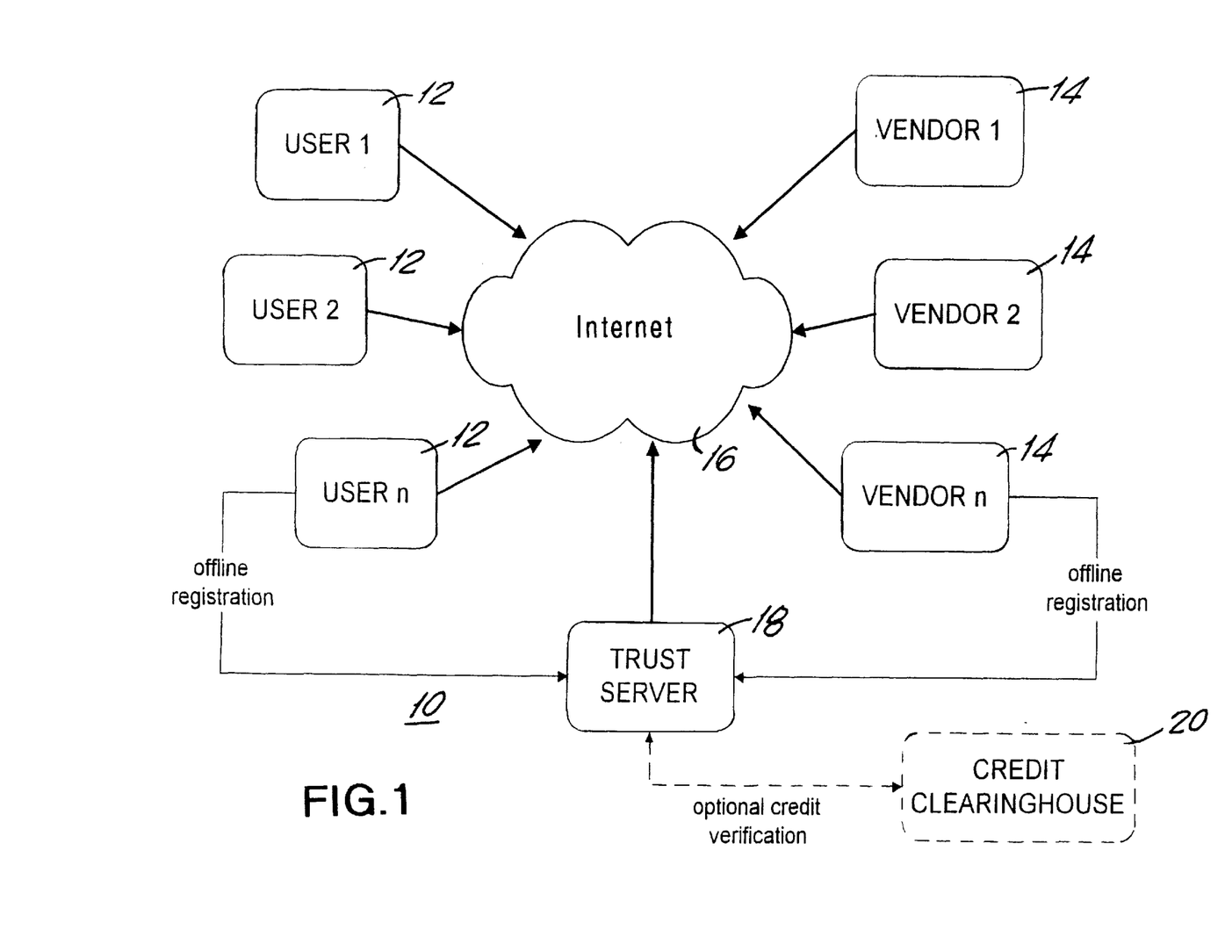
FIG. 1 is a top level system block diagram illustrating the communications of the present invention.

FIG. 1 illustrates a top level illustration of the system 10 of the present invention. A plurality of user computers 12, designated USER1, USER2, . . . USERn are interconnected to the Internet 16 by any of various means known in the art such as a dial-up modem connection to an Internet Service Provider (ISP), a direct connection to a network that is in turn connected to the Internet, etc. The Internet 16 is a global network of interrelated computer networks allowing interchange of information therebetween. Although the Internet 16 is used in the preferred embodiment, the invention is applicable to any computer network topology where secure transactions between interconnected computers are desired. Typically, a user computer 12 will be a personal computer in a home or business environment that accesses the Internet through a commercially-available browser client software package.

A plurality of vendor computers 14 designated as VENDOR1, VENDOR2, . . . VENDORn are likewise interconnected to the Internet 16 by any of various means known in the art. The vendor computer 14 may for example be an appropriate server running on a dedicated host connected to the Internet.

A trust server 18 is also interconnected to the Internet as shown in FIG. 1, and acts as a trust broker for the purpose of approving a transaction between any user computer 12 and any vendor computer 14, both of which must first be registered with the trust server 18 as will be described herein. The trust server 18 is shown with a dotted line connection to a credit clearinghouse 20, which does not form part of the present invention but which is accessed by the trust server 18 by any means known in the art (e.g. dial-up modem connection) to determine the creditworthiness of a user who requests a transaction from the trust server 18.

Each of the user computers, vendor computers, and the trust broker may communicate with each other by communication protocols well known in the art as applied to the particular network being implemented. Thus, for the preferred embodiment Internet connections, the TCP/IP protocol suite well known in the art will be implemented by each party to the transaction as described herein.

Figure 2:
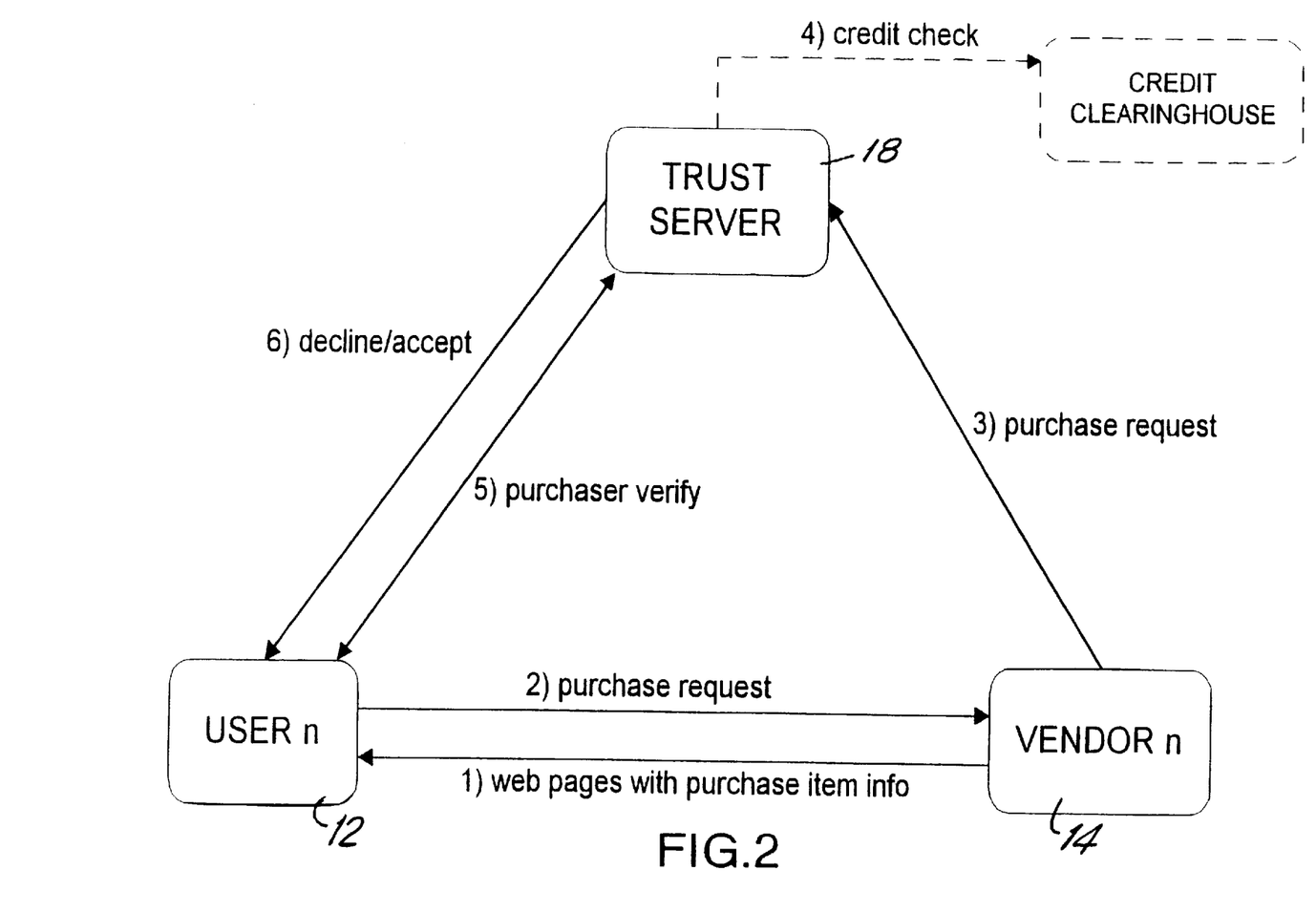
FIG. 2 is a simplified block diagram showing a single transaction and the data flow between the parties.
Figure 2A:
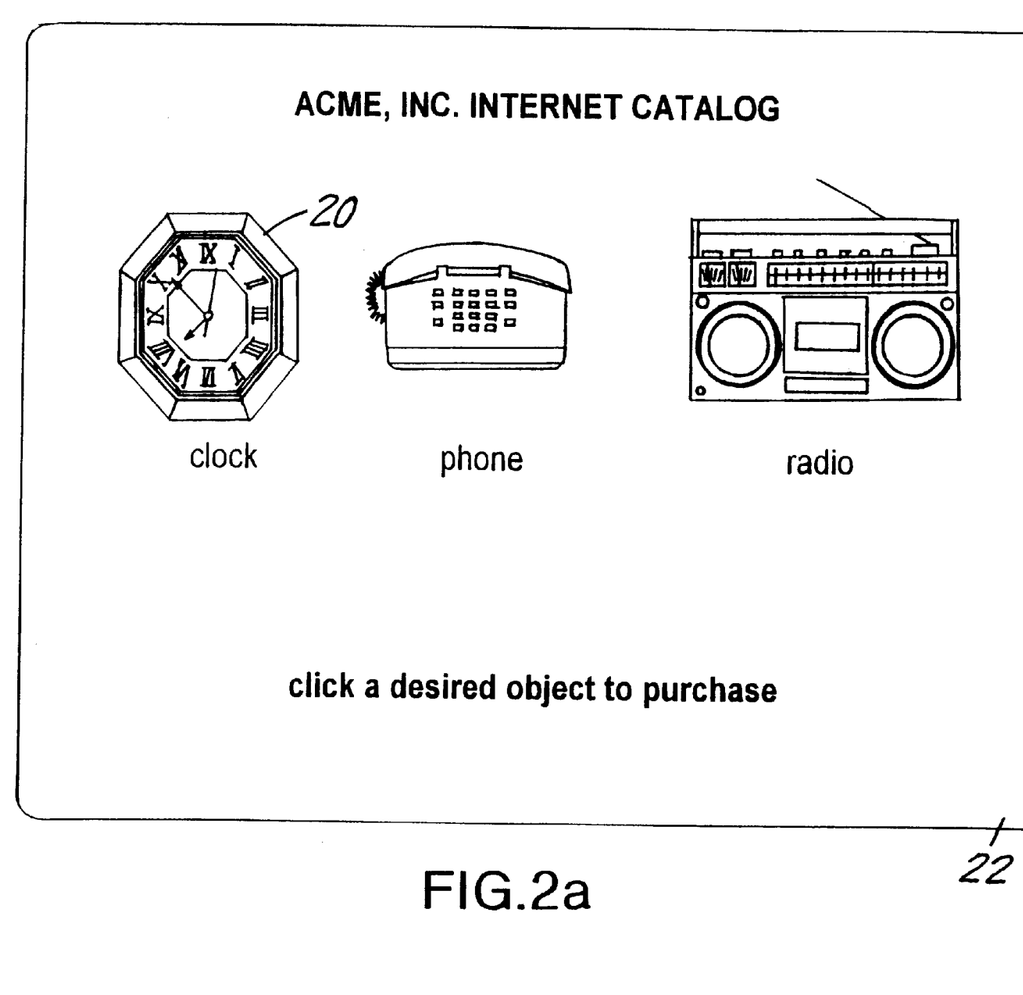
FIG. 2a illustrates a typical Web page displayed to the user for effecting the present invention.
Figure 3:
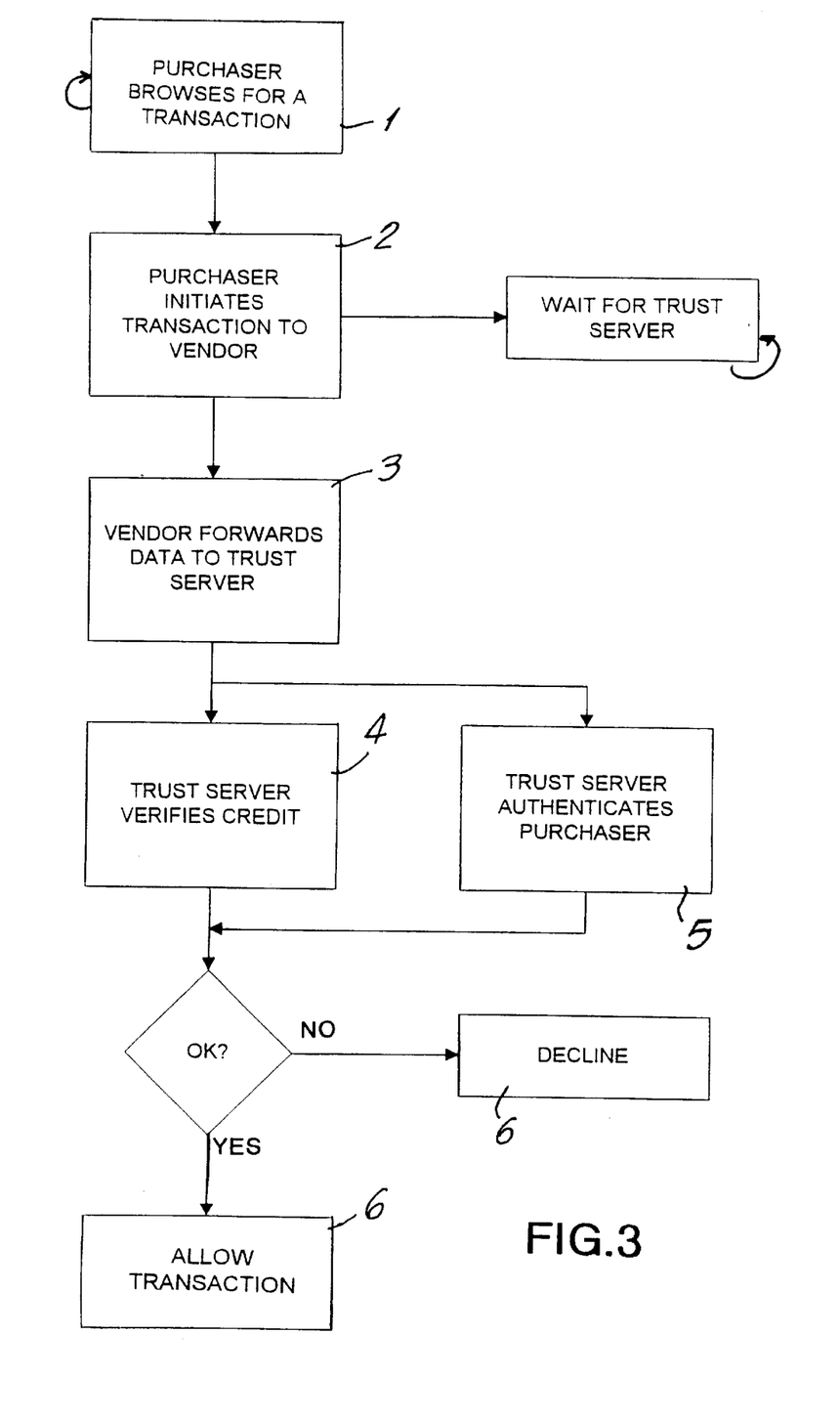
FIG. 3 is a top level flowchart of the method of the present invention.

FIGS. 2 and 3 illustrate the data flow between a user computer 12, a vendor computer 14 associated with a transaction desired by a user, and the trust server computer 18. A user begins the process during a browsing session at step 1, where he downloads pages from various vendors via an Internet browser such as Netscape, until he views a page that describes an item he desires to purchase. As shown in FIG. 2a, the user makes a transaction request by selecting an item to be purchased at step 2 by using his mouse or other pointing device associated with the computer 12 to click on a control embedded within the screen page 22 and indicative of the item, for example in HTML (hypertext markup language) format. In FIG. 2a, the user selects the clock to purchase by clicking on the associated control 20. Selection of a transaction-enabled control will initiate internal processing to be described below, and a transaction request message is transmitted by the Internet to the selected vendor computer 14 in known Internet protocol methodology. The user computer 12 then goes into a temporary wait state pending a subsequent is communication from the trust server 18.

The vendor computer 14, upon receiving the transaction request message from the user computer 12, sends an image of the transaction request to the trust server 18 via the Internet at step 3. Along with the transaction request image, the vendor computer 14 sends to the trust server 18 the IP network address of the requesting user computer 12, which will allow the trust server 18 to authenticate the identity of the user computer 12 prior to authorizing the transaction. The vendor computer 14 is finished with processing for this transaction and thus waits for another transaction request from another user.

The trust server then carries out two independent functions at substantially the same time in order to expedite the transaction request approval. One function, shown as step 4, is to communicate with the credit clearinghouse by any means known in the art, e.g. through a direct dial-up modem connection, in order to determine the creditworthiness of the user for the requested transaction. The trust server 18 knows the identity of the user and the amount of credit required to approve the transaction from data contained within the transaction request. If the credit clearinghouse does not approve the request for credit reasons, then the trust server 18 declines the transaction request and notifies the user accordingly. The vendor need never be notified in the case of a declined transaction.

At the same time, at step 5, the trust server 18 performs internal processing and data communications with the user computer 12 in order to authenticate the identity of the user computer 12 and approve the transaction. The trust server 18 knows the IP address of the user computer 12 from the data transmitted by the vendor computer 14. The trust server 18 obtains a piece of data, called the user matrix authentication number (UMAN), and compares it to a trust server matrix authentication number (TSMAN) that was calculated internally as a function of the user's identity. When the respective matrix authentication numbers match, then the user is considered to be authentic, and the transaction is approved at step 6.

Thus, the triangulation methodology of the present invention for approving a transaction request is apparent from the three-party process illustrated in FIG. 2. The user computer 12 and vendor computer 14 are both pre-registered with the trust server 18, which acts as a trust broker performing trust and authentication services. The vendor has trust in the trust server 18 and relies on its method of authenticating the user, since it knows that the trust server 18 will only allows transactions requested by registered users. Since the users are pre-registered with the trust server, the trust server can request authentication information that would only be known to the user computer 12.

Importantly, in the present invention, the user's credit card number or other like sensitive information is not transmitted between entities as part of the transaction approval process. Instead, the user registers with the trust server, to be described in more detail below, by secure communications means; i.e. by direct telephone connection, by fax, regular mail, etc. Once the trust server registers the user, it can use the credit card number for credit approval without the user needing to transmit sensitive financial information or other electronic payment means over the Internet. A further beneficial result of this process is that the vendor computer 14 is never provided with the user's credit card number or other payment account numbers, thus reducing the chances of vendor fraud in the system. The only information that the vendor obtains is the item to be purchased, and user identification information (to enable shipment to the user).

The specific methodology of the preferred embodiment will now be explained with reference to FIGS. 4A–4D. Step 1, wherein the user browses on the Internet for a desired transaction, is shown in detail in the flowchart of FIG. 4A. The user executes standard Internet browsing commands using the user browser client software running on the user computer. The Internet browser forwards appropriate browsing commands to the selected vendor computer 14, for example using HTML embedded tags as controls for accessing URL's (uniform resource locators) associated with the IP address of the vendor computer 14. In response, the vendor computer 14 transmits back to the user browser client embedded web pages for display to the user. Once the user has found a desired item or service to purchase, which will be displayed in HTML format on a vendor's web page, then the user clicks on the embedded control associated with the selected item. A user client software module is then accessed by the control, which will carry out functions appropriate for executing a transaction request.

Figure 4A:
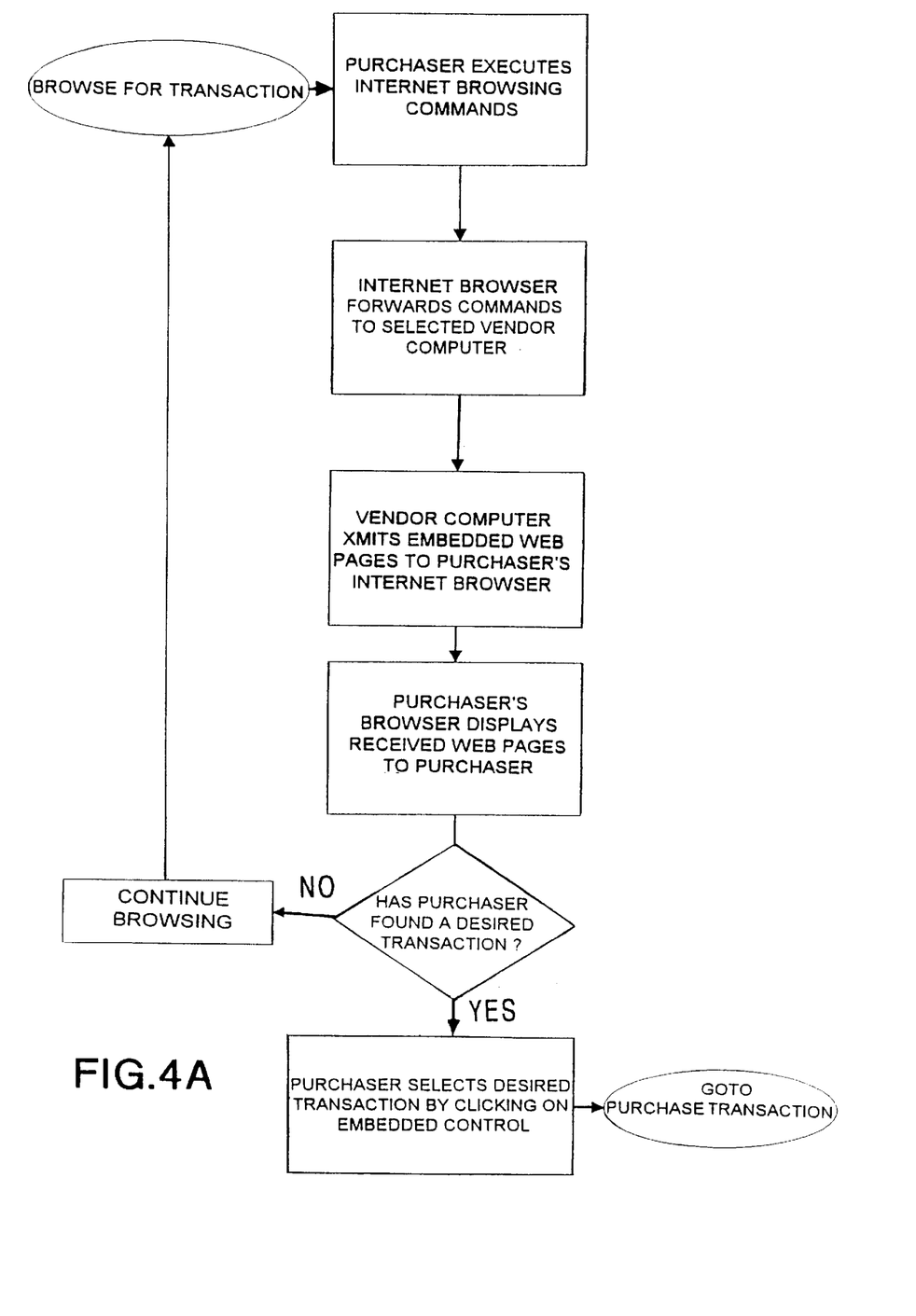
FIG. 4a is a detailed flowchart of the browsing function of the present invention.
Figure 4B:
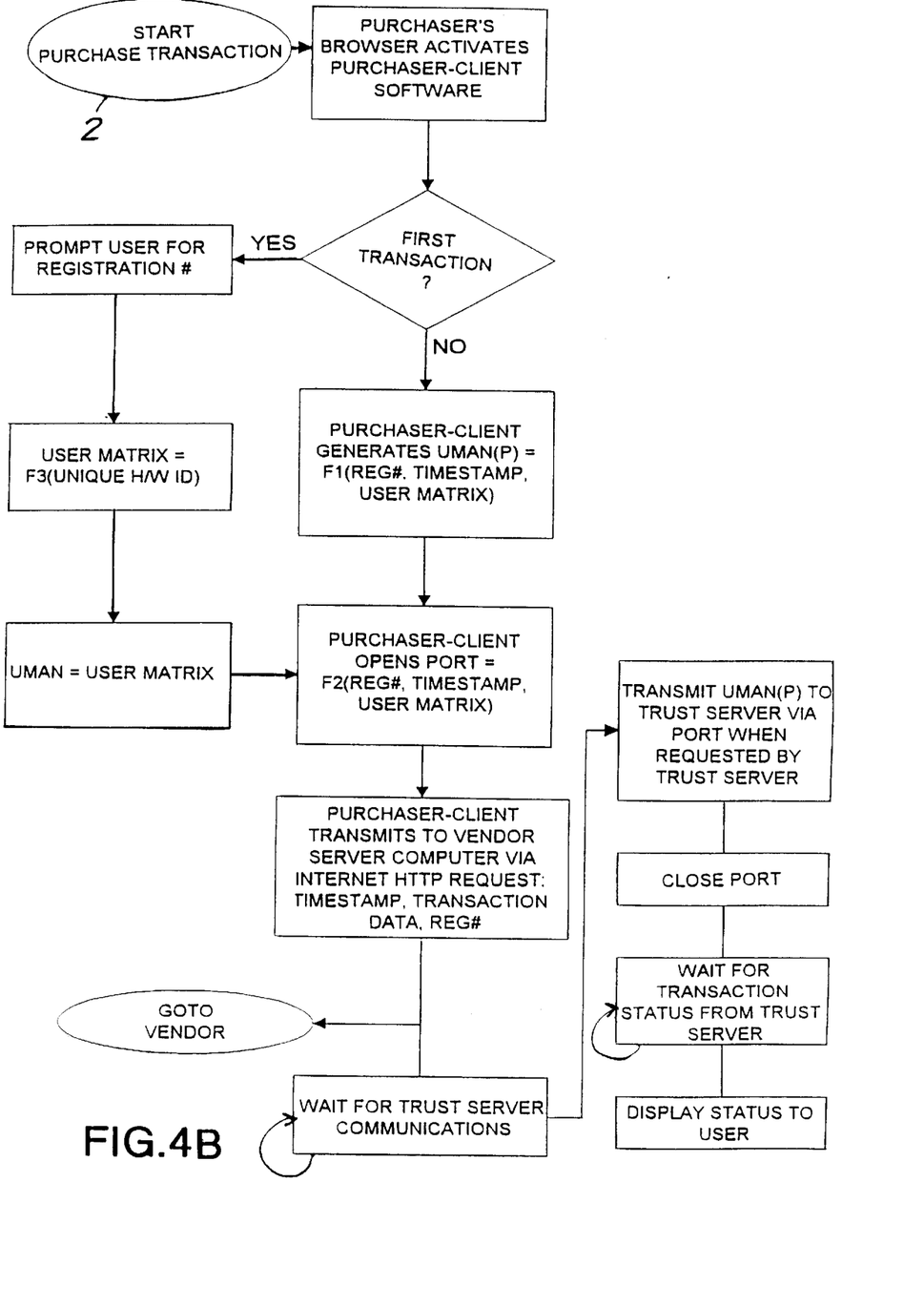
FIG. 4b is a detailed flowchart of the user transaction function of the present invention.

FIG. 4B illustrates the detailed steps carried out by the user client software module resident on the user computer 12. If the user client software module is not present on the user computer; i.e. the user has never before accessed the transaction request system of the present invention, then the embedded control will download automatically from an approved FTP site the appropriate installation routine, which will proceed to install the user client module on the user computer. If the user client module has been installed, but the present transaction is the first one carried out by the user, then the client module will prompt the user via a dialog box to enter a pre-assigned registration number that uniquely identifies the user. The user may obtain the registration number through a registration process with the trust server 18 through secure communication means such as facsimile or a toll-free telephone call. The user provides an operator associated with the at the trust server with his name, address, etc. and a credit card or other payment mechanism that the user wishes to utilize for future transactions. The trust server assigns a unique user registration number to the user, and records it along with this the user information in a local database. Thus, when the trust server receives a transaction request from a vendor, it takes the user registration number supplied by the vendor and fetches from the database the user's identification information, including the credit card number that will be used in the transaction. Thus, after the initial secure communications with the trust server, the user need not transmit his credit card number or any other data over the Internet as is required by prior art electronic commerce systems.

After the user inputs the registration number once for the first transaction request, he also is asked to input a PIN for subsequent transaction sessions. The PIN is used to only to access the user client and is not used in Internet communications. By requiring a PIN to be entered at every session, the chance of an unauthorized person illicitly using the user's computer to execute a transaction (which would then use the user's financial payment scheme or credit card number) is eliminated. Thus, in ensuing sessions, when the PIN is requested and not input properly, then access to the user client is denied and the transaction request cannot be made by the system.

Additionally at the first transaction request session, a user matrix is generated as a function of certain unique hardware identifiers found in the system. For example, the user client may fetch a serial number from the user's hard drive and process it to generate the user matrix. This is stored locally on the user's hard drive for subsequent processing and authentication with the trust server. A second variable, the user matrix authentication number (UMAN), is set equal to the user matrix for the initial transaction request only.

When the transaction request is not the first one, i.e. the user has used the system previously, then the user client module calculates the UMAN as a function of the user registration number (fetched from memory), the user matrix (fetched from memory), and a time stamp field that is correlated to the real-time clock of the user computer. The time stamp is an additional security feature that is not required, but which is preferred since it changes with every transaction request and makes it more difficult to spoof (trick) the system. The function used to generate UMAN may be any robust function generator that takes the three input variables and calculates an output; the function may be a multiplier, a matrix builder, a shift register, etc.

The identical function generator used to generate UMAN is also stored on the trust server 18, and will be used by the trust server to generate the trust server matrix authentication number TSMAN for authentication of the user computer 12.

The user client module also utilizes the user registration number, the user matrix, and the time stamp field to generate a number that is used to assign and open a protocol port number PORT per the TCP/IP format. A function generator, similar but not necessarily identical to, the function generator used to calculate UMAN, is used for the PORT calculation. That is, PORT may be any robust function generator that takes the three input variables and calculates an output; the function may be a multiplier, a matrix builder, a shift register, etc.

As with the UMAN authentication calculation, the identical function generator used to generate PORT is also stored on the trust server 18, and will be used by the trust server to generate the protocol port number PORT for communications with the user computer 12.

The user client module also assembles a transaction request message for transmitting over the Internet to the vendor computer 14. The transaction request message is comprised of the user registration number, the time stamp field, and transaction data indicative of the item elected for purchase. The transaction data may be in the form of a SKU, a catalog number, or the like, and it may optionally describe the price of the item selected for purchase. If the price data is omitted, then the vendor computer 14 must add the price data when it re-transmits the message to the trust server 18 for approval.

The transaction request message is then transmitted via the Internet to the vendor computer 14 by an appropriate protocol, such as by an HTTP (hypertext transfer protocol) request. HTTP is well known in the art and is currently a popular mode of transmitting data packets (IP datagrams) over the Internet. Of particular relevance to the present invention is the ability of the recipient, in this case the vendor computer 14, to extract from the HTTP request header the IP address of the source computer, i.e. the user computer 14. The invention is not limited to being used with HTTP, however, since any transfer protocol that allows the recipient to extract the sending computer's network address will also be operable. If the transfer protocol used does not provide such information, then the transaction request message must be provided with it during the message assembly by the user computer.

After transmitting the transaction request message to the vendor computer 14, the user computer 12 sits in a wait state pending communications from the trust server 18 via the open protocol port PORT.

Figure 4C:
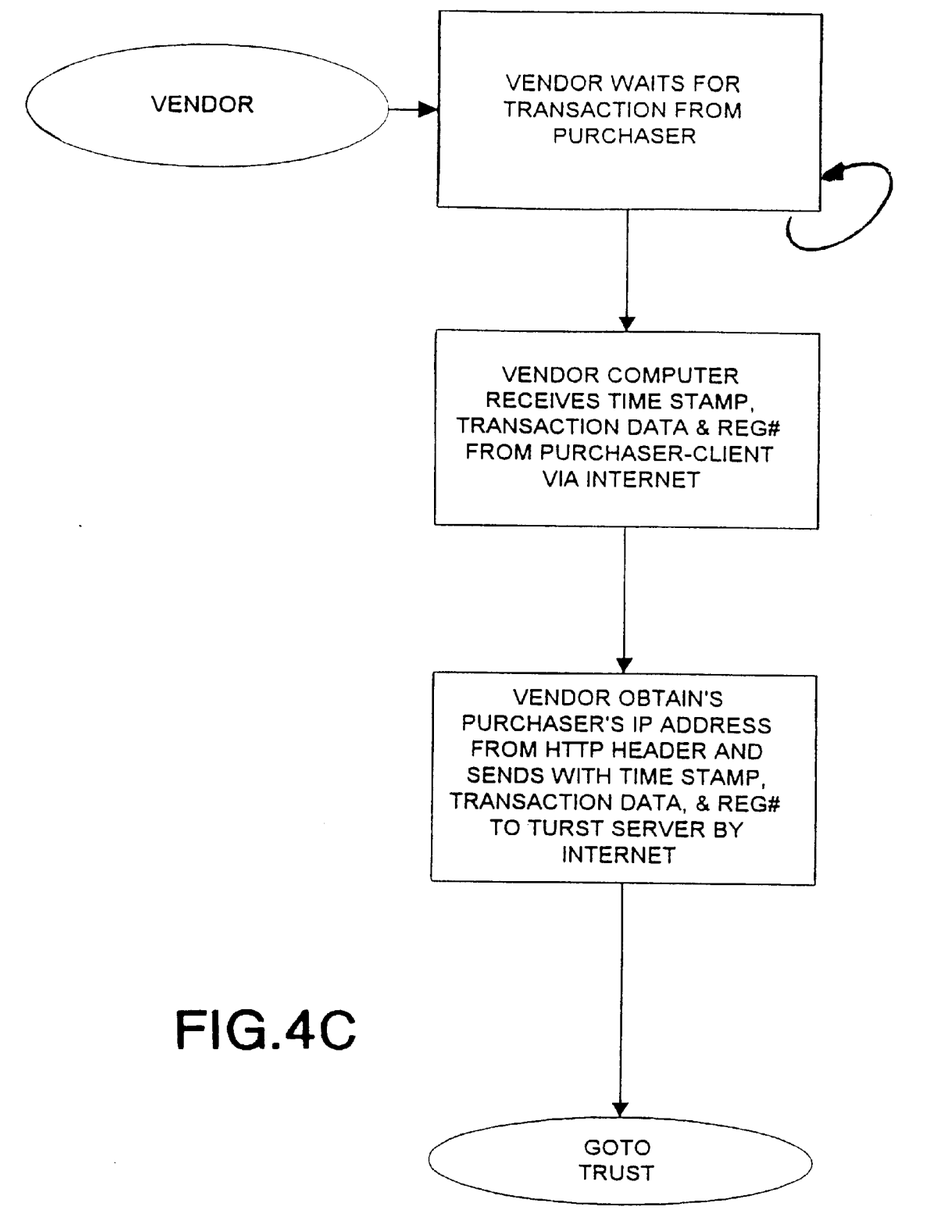
FIG. 4c is a detailed flowchart of the vendor function of the present invention.

As shown in FIG. 4c, the vendor computer 14 receives the transaction request message over the Internet and assembles a transaction verification request for transmission to the trust server. The transaction verification request is essentially an image of the transaction request message, and comprises the user registration number and the time stamp field taken from the transaction request message as well as transaction data indicative of the item selected for purchase, in particular of its price. If the user computer 12 provided only a SKU or catalog number, then the vendor computer 14 must first look up the price of the item for inclusion in the transaction verification request sent to the trust sever 18. The transaction verification request also includes the computer network address of the requesting user computer 12; i.e. the IP address that is obtained from the HTTP request header prepended to the transaction request message.

Thus, the information provided to the trust server 18 from the vendor computer 14 is the identity of the user (via the user registration number), the network location of the user computer (via the IP address), the price of the item to be purchased, and the time that the transaction was requested. The trust server 18 will use this information to determine the creditworthiness of the user as well as to authenticate his identity.

The vendor computer 14 is now out of the loop for purposes of this invention, and it waits for subsequent transaction requests from other users. The vendor will be informed, by any appropriate means, if the transaction is approved or declined.

Figure 4D:
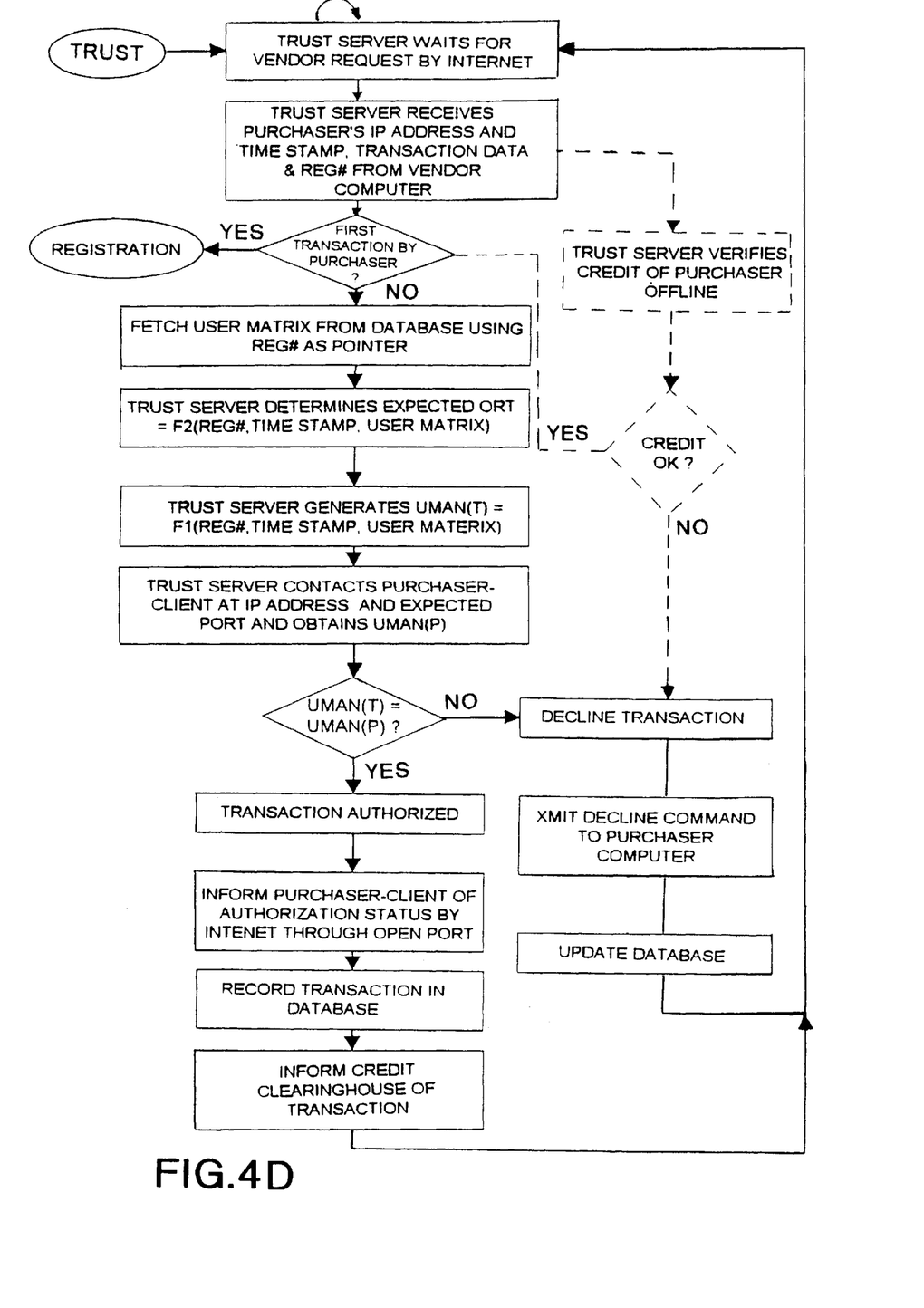
FIG. 4d is a detailed flowchart of the trust server function of the present invention.
Figure 5:
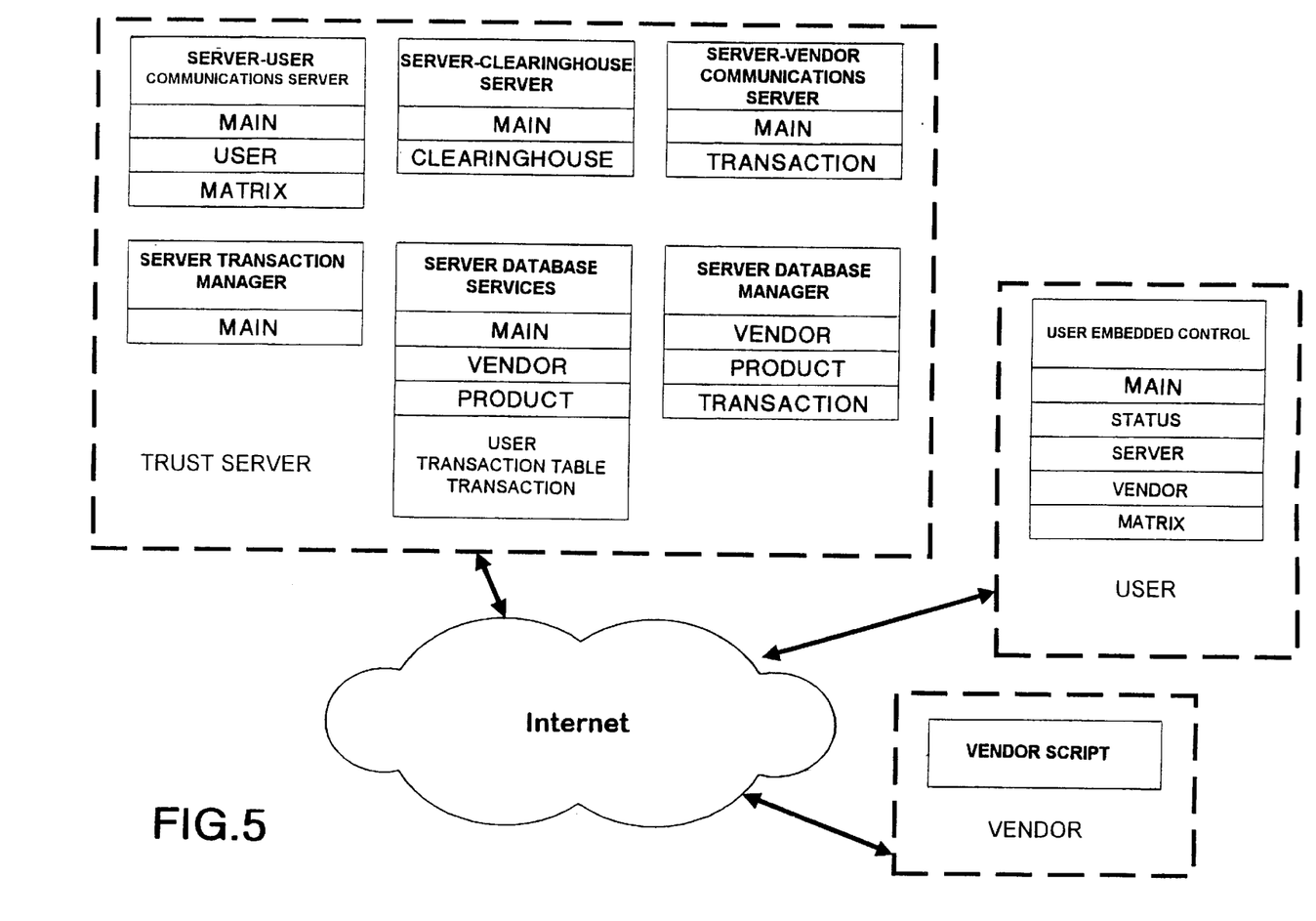
FIG. 5 is an illustration of the software component architecture of the present invention.
Figure 6:
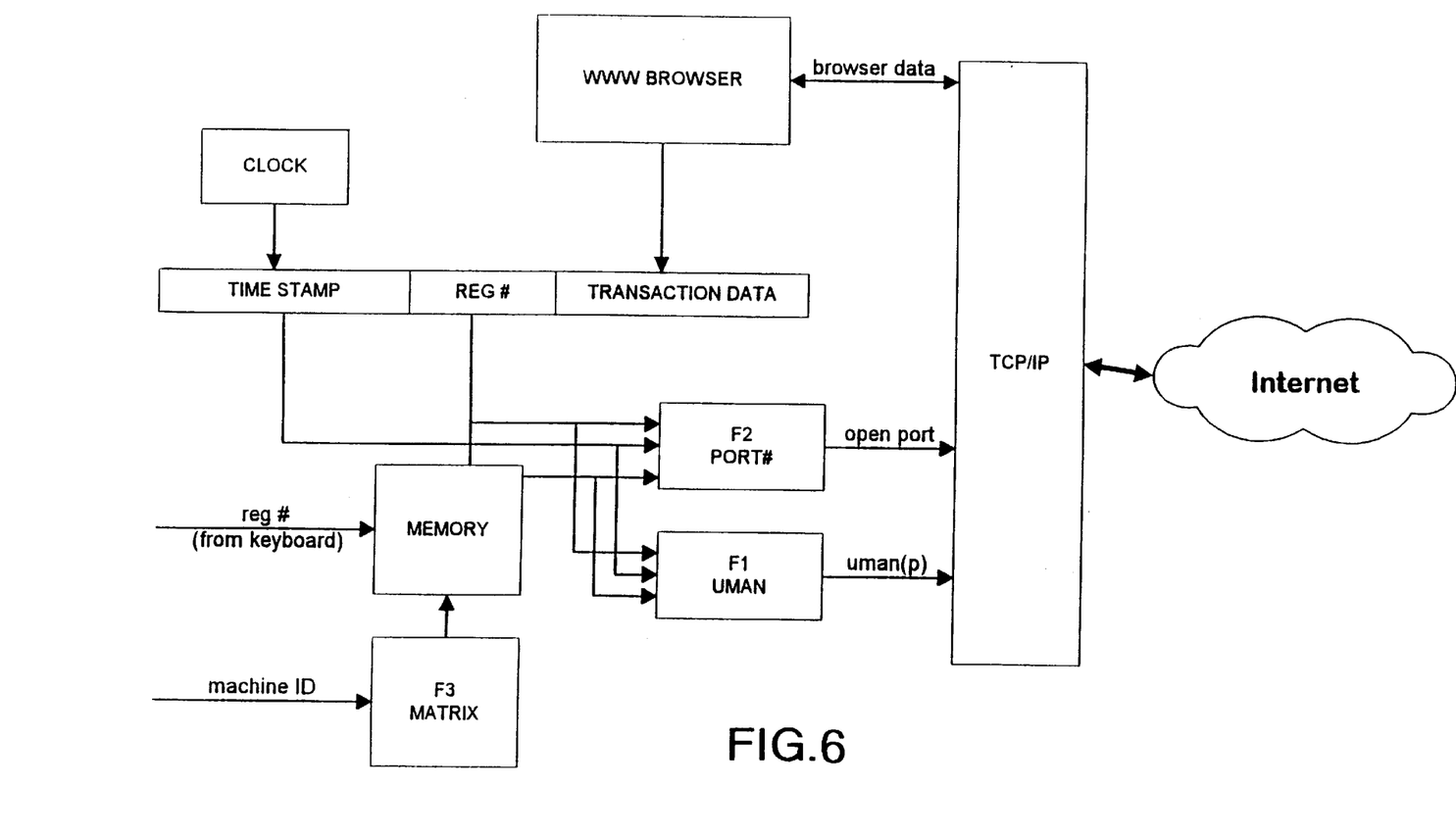
FIG. 6 is a block diagram of the user computer functionality for carrying out the present invention.

The trust server 18 receives the transaction verification request from the vendor computer 14 and proceeds to carry out two independent and essentially simultaneous processes, as shown in FIG. 4d. The trust server 18 unpacks the verification request and fetches information regarding the identity of the user by accessing an internal database with the user registration number as a pointer. The trust server uses this identity information along with the price data unpacked from the message and communicates with the credit clearinghouse to determine if the user has appropriate credit for carrying out the desired transaction. This may be done by fax, telephone, dial-up modem, or over the Internet. The credit clearinghouse returns with a decision; if declined, the process ends and the user is informed by a communications channel as set forth below, if accepted, then the trust server continues with the authentication process.

Assuming that this is not the first transaction requested by this user, then the trust server implements the user registration number as a pointer to its database and fetches therefrom the user matrix previously stored for that particular user. The trust server then calculates the trust server matrix authentication number (TSMAN) as a function of the user registration number, the user matrix (fetched from memory), and the received time stamp field. The function used to generate TSMAN is identical to the function stored on the user computer 12 and used by the uiser computer to generate UMAN.

The user client module also utilizes the user registration number, the user matrix, and the time stamp field to calculate the expected network protocol port number PORT_EXP. As with the TSMAN authentication calculation, the identical function generator used to generate PORT_EXP is also stored on the user computer 12 and used by the user computer to generate the protocol port number PORT for communications with the trust server 18.

The trust server then initiates a communication over the Internet with the user computer 12 by sending a data request to the IP address that was received from the vendor computer 14 and the calculated protocol port number PORT_EXP. The user computer 12, which was in a temporary wait state pending receipt of this request, then returns to the trust server the value UMAN via the open PORT. The trust server 18, upon receipt of UMAN, compares UMAN with the calculated TSMAN for authentication of the user computer.

If the comparison step passes (UMAN=TSMAN), then the transaction is approved (assuming the credit check passes) and the user computer 12 is notified by the existing Internet connection. The credit clearinghouse is informed of the transaction, which updates its records accordingly. The vendor is ultimately notified that the transaction has been approved, so that it may carry out its part of the transaction, e.g. ship the purchased goods to the user. The vendor will be paid for the transaction by any means used in the art for credit card transactions.

If the comparison step fails, then the transaction is declined and the user computer 12 is notified by the existing Internet connection.

The status of the transaction is also stored by the trust server 18 in an internal database for subsequent analysis and processing.

The triangulation methodology of the present invention is advantageously based on a trust basis, wherein the trust sever already has knowledge of the identity of the user and vendor computers through the pre-registration process. Since sensitive information such as credit card numbers are not communicated during a transaction, the data may be passed unencrypted. Reliance on encryption as in prior art systems is undesirable, since it is commonly accepted that an eavesdropper, given enough time, can illicitly decipher the transmissions and spoof the system to the detriment of all parties involved. In this system, an eavesdropper is only able to capture part of the data needed to spoof the system since the authentication data (UMAN) requested by the trust server will change as a function of the time stamp.

Essentially, the trust sever and the user have knowledge of identical data patterns that are generated "on the fly" (in real-time) in accordance with variables that are known only to each party and stored as a function of the user registration number. Of course, the data patterns may be stored in memory rather than calculated on-the-fly for each transaction, but the memory requirements for such an embodiment would be extremely large and costly. By storing only the matrix, and using it to generate the matrix when required by identical function generators, then the memory storage requirements are lessened considerably.

The system finds useful analogy in a library metaphor. Consider the user computer and the trust server to have the same library of books, each of which has been custom-written and thus unknown to the world in general. When the trust server asks for authentication data, it is essentially asking for a certain word from a certain book in the user's library. Since the trust server has the same library, it knows what the word should be if the request is answered by the proper user. In essence, the user computer tells the trust server: "I will provide to you the twelfth word from the fourth paragraph in the sixteenth chapter of the forty-second book on the ninth shelf of the first wall of your library." This map to the proper word is provided via transmission of the user registration number and the time stamp via the transaction request message. The trust server can determine from these variables which word the user computer will have waiting, and can check it against its own mirror image library. Since the specific word transmitted over the Internet in unencrypted format will necessarily change from request to request, even for the same user, then an eavesdropper cannot spoof the system since he has no way of predicting the word that will satisfy the particular request since he does not have the same library available to him. Capture of one word thus does the eavesdropper no good.

In the preferred embodiment, the function used to generate UMAN and TSMAN operates to generate a matrix using the registration number, the matrix number, and the time stamp as input variables. For example, a 16×16 matrix could be generated by forming various predetermined combinations of portions of the registration number, matrix and time stamp, and a specific location could be tagged to the UMAN and TSMAN variables by using another predetermined combination of the same variables. Since the time stamp changes from request to request, the UMAN and TSMAN will also change.

In an alternative embodiment, the vendor computer 14 may be eliminated from the authentication process, and the user computer 12 and the trust server 18 communicate with each other directly. In this embodiment, the user sends a transaction request message directly to the trust server, and the protocol port is opened and used for such communications. Everything else stays essentially the same as in the preferred embodiment.

What is claimed is:

1. A method for executing a secure online transaction between a user computer and a vendor computer, the vendor computer and the user computer being interconnected to a computer network for data communications therebetween, the user computer having associated therewith a network address unique thereto at the time of the request; the method comprising the steps of:

a) the user computer executing a transaction request, comprising the steps of
   i) generating a user authentication number as a first function of
      a user registration number unique to the user computer,
      time stamp data correlated to the time of the transaction request, and
      an internally stored user matrix unique to the user computer;
   ii) assigning a network protocol port number as a second function of
      the user registration number,
      the time stamp data, and
      the user matrix;
   iii) transmitting a transaction request message to the vendor computer via the computer network, the transaction request message comprising
      the user registration number,
      the time stamp data,
      first data indicative of the requested transaction, and
      the network address associated with the user computer;

b) in response to receiving the transaction request message, the vendor computer sending a transaction verification request to a trust server computer interconnected to the computer network, the transaction verification request comprising
   (i) the user registration number,
   (ii) the time stamp data,
   (iii) second data indicative of the requested transaction, and
   (iv) the network address associated with the user computer;

c) in response to receiving the transaction verification request from the vendor computer, the trust server computer authenticating the user computer by
   (i) calculating the user matrix by from an internal memory by utilizing the received user registration number to address the memory,
   (ii) generating a trust server authentication number as a first function of
      the received user registration number,
      the received time stamp data, and
      the calculated matrix;
   (iii) calculating an expected network protocol port number as a second function of
      the received user registration number, the received time stamp data, and
the calculated user matrix,
  (iv) communicating via the computer network with the user computer by utilizing the user computer network address received from the vendor computer and the calculated expected network protocol port number,
  (v) obtaining from the user computer the user authentication number,
  (vi) comparing the obtained user authentication number with the generated trust server authentication number; and
  vii) indicating that the user computer is authentic when the comparison step has passed, and indicating that the user computer is not authentic when the comparison step has failed.

2. The method of claim 1 in which:
the first function for generating the user authentication number comprises the step of synthesizing a user matrix as a third function of the user matrix; and
the first function for generating the trust server authentication number comprises the step of synthesizing a trust server user matrix as a third function of the calculated matrix.

3. The method of claim 2 in which:
the first function for generating the user authentication number utilizes the user registration number and the time stamp data to extract the user authentication number from the synthesized user matrix; and
the first function for generating the trust server authentication number utilizes the user registration number and the time stamp data to extract the trust server authentication number from the synthesized trust server user matrix.

4. A method for executing a secure online transaction between a user computer and a vendor computer, the vendor computer and the user computer being interconnected to a computer network for data communications therebetween, the user computer having associated therewith a network address unique thereto at the time of the request; the method comprising the steps of:
  a) the user computer executing a transaction request, comprising the steps of
    i) generating a user authentication number as a first function of
      a user registration number unique to the user computer, and
      an internally stored user matrix unique to the user computer;
    ii) assigning a network protocol port number as a second function of
      the user registration number, and
      the user matrix;
    iii) transmitting a transaction request message to the vendor computer via the computer network, the transaction request message comprising
      the user registration number,
      first data indicative of the requested transaction, and
      the network address associated with the user computer;
  b) in response to receiving the transaction request message, the vendor computer sending a transaction verification request to a trust server computer interconnected to the computer network, the transaction verification request comprising
    (i) the user registration number,
    (ii) second data indicative of the requested transaction, and
    (iv) the network address associated with the user computer;
  c) in response to the transaction verification request from the vendor computer, the trust server computer authenticating the user computer by
    (i) calculating the user matrix from an internal memory by utilizing the received user registration number to address the memory,
    (ii) generating a trust server authentication number as a first function of
      the received user registration number, and
      the calculated matrix,
    (iii) calculating an expected network protocol port number as a second function of
      the received user registration number, and
      the calculated user matrix,
    (iv) communicating with the user computer by utilizing the user computer network address received from the vendor computer and the calculated expected network protocol port number,
    (v) obtaining from the user computer the user authentication number,
    (vi) comparing the obtained user authentication number with the generated trust server authentication number; and
    (vii) indicating that the user computer is authentic when the comparison step has passed, and indicating that the user computer is not authentic when the comparison step has failed.

5. The method of claim 4 in which:
the first function for generating the user authentication number comprises the step of synthesizing the user matrix as a third function of the user matrix; and
the first function for generating the trust server authentication number comprises the step of synthesizing the trust server user matrix as a third function of the calculated matrix.

6. The method of claim 5 in which:
the first function for generating the user authentication number utilizes the user registration number to extract the user authentication number from the synthesized user matrix; and
the first function for generating the trust server authentication number utilizes the user registration number to extract the trust server authentication number from the synthesized trust server user matrix.

7. The method of claim 4 wherein the user authentication number generated by the user computer is also a first function of time stamp data correlated to the time of the transaction request, the transaction request message transmitted by the user computer to the vendor computer also comprises the time stamp data, the transaction verification request sent by the vendor computer to the trust server computer also comprises the time stamp data, and the trust server authentication number generated by the trust server computer is also a first function of the received time stamp data.

8. The method of claim 4 wherein the network protocol port number assigned by the user computer is also a second function of time stamp data correlated to the time of the transaction request, the transaction request message transmitted by the user computer to the vendor computer also comprises the time stamp data, the transaction verification request sent by the vendor computer to the trust server also comprises the time stamp data, and the expected network protocol port number is calculated as a second function of the received time stamp data.

9. A method for executing a secure online transaction between a user computer and a vendor computer, the vendor computer and the user computer being interconnected to a computer network for data communications therebetween, the user computer having associated therewith a network address unique thereto at the time of the request; the method comprising the steps of:

a) the user computer executing a transaction request, comprising the steps of
  i) generating a user authentication number as a first function of
    a user registration number unique to the user computer, and
    time stamp data correlated to the time of the transaction request;
  ii) assigning a network protocol port number as a second function of
    the user registration number, and
    the time stamp data;
  iii) transmitting a transaction request message to the vendor computer via the computer network, the transaction request message comprising
    the user registration number,
    the time stamp data,
    first data indicative of the requested transaction, and
    the network address associated with the user computer;
b) in response to the transaction request message, the vendor computer sending a transaction verification request to a trust server computer interconnected to the computer network, the transaction verification request comprising
  (i) the user registration number,
  (ii) the time stamp data,
  (iii) second data indicative of the requested transaction, and
  (iv) the network address associated with the user computer;
c) in response to receiving the transaction verification request from the vendor computer, the trust server computer authenticating the user computer by (i) generating a trust server authentication number as a first function of
    the received user registration number, and
    the received time stamp data;
  (iii) calculating an expected network protocol port number as a second function of
    the received user registration number, and
    the received time stamp data, and
  (iv) communicating with the user computer by utilizing the user computer network address received from the vendor computer and the calculated expected network protocol port number,
  (v) obtaining from the user computer the user authentication number,
  (vi) comparing the obtained user authentication number with the generated trust server authentication number; and
  (vii) indicating that the user computer is authentic when the comparison step has passed, and indicating that the user computer is not authentic when the comparison step has failed.

10. The method of claim 9 wherein the user authentication number generated by the user computer is also a first function of an internally stored user matrix unique to the user computer, the trust server computer fetches from memory the user matrix by utilizing the received user registration number as the memory address, and the trust server authentication number generated by the trust server computer is also a first function of the calculated user matrix.

11. The method of claim 9 the network protocol port number assigned by the user computer as also a second function of an internally stored user matrix unique to the user computer, the trust server computer fetches from memory the user matrix by utilizing the received user registration number as the memory address, and the expected network protocol port number is calculated by the trust server computer also as a second function of the calculated user matrix.

* * * * *